United States Patent
Chen et al.

(10) Patent No.: US 9,938,418 B2
(45) Date of Patent: Apr. 10, 2018

(54) SURFACE MODIFICATION OF SILICA IN AN AQUEOUS ENVIRONMENT COMPRISING ALUMINUM CHLORIDE HYDRATE

(75) Inventors: Tienteh Chen, San Diego, CA (US); Yubai Bi, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 226 days.

(21) Appl. No.: 13/113,841

(22) Filed: May 23, 2011

(65) Prior Publication Data

US 2011/0223424 A1  Sep. 15, 2011
US 2017/0260404 A9  Sep. 14, 2017

Related U.S. Application Data

(62) Division of application No. 12/203,889, filed on Sep. 3, 2008, now Pat. No. 7,947,346, which is a division of application No. 10/769,385, filed on Jan. 30, 2004, now Pat. No. 7,435,450.

(51) Int. Cl.
| | | |
|---|---|---|
| B32B 5/16 | (2006.01) | |
| B41M 1/22 | (2006.01) | |
| C09D 11/037 | (2014.01) | |
| C09C 1/30 | (2006.01) | |
| C09C 1/40 | (2006.01) | |

(52) U.S. Cl.
CPC ............. *C09D 11/037* (2013.01); *C09C 1/30* (2013.01); *C09C 1/3081* (2013.01); *C09C 1/407* (2013.01); *C01P 2004/64* (2013.01)

(58) Field of Classification Search
CPC .......................... C09C 1/3054; C09C 1/3081
USPC ............................ 428/403–407, 32.36, 32.37
See application file for complete search history.

(56) References Cited

U.S. PATENT DOCUMENTS

| | | | |
|---|---|---|---|
| 3,007,878 A * | 11/1961 | Alexander et al. ............. 516/80 |
| 3,139,406 A * | 6/1964 | Mindick et al. ................ 516/80 |
| 3,252,917 A * | 5/1966 | Mindick et al. ................ 516/80 |
| 3,689,300 A * | 9/1972 | Bunger et al. ............. 106/287.1 |
| 4,008,099 A | 2/1977 | Lindstrom |
| 4,164,068 A | 8/1979 | Shropshire et al. |
| 4,275,130 A | 6/1981 | Rippel et al. |
| 4,407,920 A * | 10/1983 | Lee et al. ...................... 430/58.8 |
| 4,614,025 A | 9/1986 | vanOmmering et al. |
| 4,877,451 A * | 10/1989 | Winnik .................. B82Y 30/00 106/287.11 |
| 4,933,387 A | 6/1990 | Wason |
| 5,264,275 A | 11/1993 | Misuda et al. |
| 5,275,867 A | 1/1994 | Misuda et al. |
| 5,344,723 A | 9/1994 | Bronoel et al. |
| 5,372,884 A | 12/1994 | Abe et al. |
| 5,411,585 A * | 5/1995 | Avery et al. ................ 106/287.1 |
| 5,463,178 A | 10/1995 | Suzuki et al. |
| 5,611,823 A | 3/1997 | Klein |
| 5,612,281 A | 3/1997 | Kobayashi et al. |
| 5,618,641 A | 4/1997 | Arias |
| 5,688,615 A | 11/1997 | Mrotek et al. |
| 5,873,934 A | 2/1999 | Kunii et al. |
| 5,916,709 A | 6/1999 | Arias et al. |
| 5,965,244 A | 10/1999 | Tang et al. |
| 5,965,252 A | 10/1999 | Santo et al. |
| 6,139,987 A | 10/2000 | Koo et al. |
| 6,183,844 B1 | 2/2001 | Li |
| 6,203,899 B1 | 3/2001 | Hirose et al. |
| 6,238,784 B1 | 5/2001 | Mochizuki et al. |
| 6,420,039 B1 * | 7/2002 | Field et al. .................... 428/451 |
| 6,592,970 B2 * | 7/2003 | Ohta et al. ................. 428/195.1 |
| 6,773,771 B1 * | 8/2004 | Ashida et al. ............. 428/32.34 |
| 6,896,942 B2 | 5/2005 | Fruge et al. |
| 7,435,450 B2 * | 10/2008 | Chen et al. .................... 427/402 |
| 7,744,959 B2 | 6/2010 | Bi et al. |
| 7,906,188 B2 * | 3/2011 | Bi et al. ..................... 428/32.34 |
| 7,947,346 B2 * | 5/2011 | Chen et al. ................ 428/32.36 |
| 2003/0072998 A1 | 4/2003 | Fredriksson et al. |
| 2003/0181566 A1 | 9/2003 | Chapman et al. |
| 2003/0198759 A1 * | 10/2003 | Fruge et al. ................. 428/32.1 |
| 2004/0003754 A1 | 1/2004 | Ishibashi et al. |
| 2004/0197498 A1 * | 10/2004 | Bi .......................... B41M 5/506 428/32.34 |
| 2005/0170109 A1 * | 8/2005 | Chen et al. ................ 428/32.36 |
| 2005/0260493 A1 | 11/2005 | Frederiksson et al. |
| 2006/0062941 A1 * | 3/2006 | Bi et al. ..................... 428/32.34 |
| 2006/0078696 A1 * | 4/2006 | Furholz ................ B41M 5/5218 428/32.34 |
| 2008/0216709 A1 * | 9/2008 | Steingrover et al. ..... 106/287.11 |
| 2008/0317981 A1 * | 12/2008 | Chen et al. ................ 428/32.31 |

FOREIGN PATENT DOCUMENTS

| | | |
|---|---|---|
| EP | 0663620 | 10/1993 |
| EP | 0631338 | 12/1994 |
| EP | 0676822 | 10/1995 |
| EP | 0696516 | 2/1996 |
| EP | 0732219 | 9/1996 |
| EP | 1262455 | 12/2002 |
| EP | 1464511 | 10/2004 |
| EP | 1559750 | 8/2005 |
| GB | 1342787 | 1/1974 |
| WO | WO0020221 | 4/2000 |
| WO | 0078675 | 12/2000 |
| WO | WO0103224 | 1/2001 |
| WO | WO0103225 | 1/2001 |
| WO | 02064888 | 8/2002 |
| WO | 2006040304 | 4/2006 |
| WO | 2006044106 | 4/2006 |
| WO | 2007019033 | 2/2007 |

* cited by examiner

*Primary Examiner* — Holly Le
(74) *Attorney, Agent, or Firm* — Thorpe, North & Western L.L.P.

(57) ABSTRACT

The present invention is generally directed to treated silica particulates for use in ink-jet media coatings, comprising silica particulates being surface-activated by a surface activating agent; the surface active agent including an aluminum chloride hydrate, and where the silica particulates are also reagent-modified by an organosilane reagent; the organosilane reagent including an amine-containing silane.

8 Claims, No Drawings

SURFACE MODIFICATION OF SILICA IN AN AQUEOUS ENVIRONMENT COMPRISING ALUMINUM CHLORIDE HYDRATE

CROSS REFERENCE TO RELATED APPLICATIONS

This application is a divisional of U.S. application Ser. No. 12/203,889, filed on Sep. 3, 2008, which is a divisional of U.S. application Ser. No. 10/769,385, filed on Jan. 30, 2004.

FIELD OF THE INVENTION

The present invention relates generally to the modification of silica in an aqueous environment. More specifically, the present invention relates to the preparation of reagent-modified and surface-activated silica particulates which can be used to prepare ink-jet media coatings.

BACKGROUND OF THE INVENTION

Ink-jet inks typically comprise an ink vehicle and a colorant, the latter of which may be a dye or a pigment. Dye-based ink-jet inks used in photographic image printing are almost always water-soluble dyes. As a result, such dye-based ink-jet inks are usually not very water fast, i.e. images tend to shift in hue and edge sharpness is reduced upon exposure to humid conditions. In addition, images created from these water-soluble dye-based ink-jet inks tend to fade over time, such as when exposed to ambient light and/or air. Pigment-based inks on the other hand, allow the creation of images that are vastly improved in humid fastness and image fade resistance. Pigment based images, however, are inferior to dye-based ink-jet inks with respect to the desirable trait of color saturation.

Print media surfaces play a key role in the fade properties and humid fastness of ink jet produced printed images. Thus, for a given ink, the degree of fade and humid fastness can be dependent on the chemistry of the media surface. This is especially true in the case of dye-based ink jet ink produced images. As a result, many ink-jet inks can be made to perform better when an appropriate media surface is used.

In order for the ink jet industry to effectively compete with silver halide photography, it is desirable that ink jet produced images be color saturated, fade resistant, and humid fast, to name a few goals. Thus, enhanced permanence of dye-based ink-jet ink produced images is becoming more and more integral to the long-term success of photo-quality ink-jet ink technologies.

A few categories of photographic ink-jet media are currently available, including polymer coated media, clay coated media, and porous coated media. It is the polymer-coated media that provides for the longest lasting ink-jet ink produced images. However, this category of media is generally inferior in dry time and humid fastness relative to porous coated media. On the other hand, image fade resistance and humid fastness of porous coated media is generally lower than that of its polymer coated media counterpart. Therefore, there is a great desire to improve the image permanence of ink jet ink images printed on porous coated media.

Image permanence improvements have been attempted via modification of the ink. They have also been attempted via modification of the media. Surface modification of porous media coatings is one of the methods of media modification that has been attempted. Such modifications have been carried out in organic solvents, which can be costly and complicated at scale up, as well as pose environmental concerns. Simpler and more economical modification methods giving a desired end result would be an advancement in the art.

SUMMARY OF THE INVENTION

In accordance with embodiments of the present invention, various methods can be used to chemically modify porous inorganic particulates such that the modified particulates, when used as media coatings, provide certain advantages related to image permanence. It has been discovered that such methods can be carried out in an aqueous environment, rather than in typical organic solvent-based environments.

In accordance with this, a method of treating silica in an aqueous environment can comprise dispersing silica particulates in an aqueous environment to form an aqueous dispersion; reversing the net charge of a surface of the silica particulates from negative to positive using a surface activating agent, thereby forming surface-activated silica particulates dispersed in the water; and contacting the surface-activated silica particulates with organosilane reagents. This method can result in reagent-modified and surface-activated silica particulates, also referred to herein as treated silica. In one embodiment, these treated silica particulates can be used to prepare ink-jet media sheets by the additional steps of preparing a porous coating composition including the reagent-modified and surface-activated silica particulates and an organic binder, and coating the porous coating composition on a media substrate.

In another embodiment, treated silica particulates for use in ink-jet media coatings can comprise silica particulates being surface-activated by a member selected from the group consisting of an aluminum chloride hydrate, a trivalent metal oxide, a tetravalent metal oxide, and combinations thereof. Further, the silica particulates can also be reagent-modified by an organosilane reagent. These treated silica particulates can be used to prepare ink-jet media sheets. Such a media sheet can include a porous coating composition including the treated silica particulates and a binder admixed with the treated silica particulates. This porous coating composition can be coated on a media substrate to form the ink-jet media sheet.

In another embodiment, a system for printing ink-jet images with minimal dye mobility can comprise a media sheet and an ink-jet ink. The media sheet can have a porous coating composition coated thereon that includes treated silica particulates being reagent-modified and surface-activated in an aqueous environment, wherein the treated silica particulates have a net positive charge. A binder can be admixed with the treated silica particulates to form the porous coating composition, and a media substrate can have the porous coating composition coated thereon. Further, the ink jet ink can have an anionic dye colorant configured for being printed on the media sheet.

Additional features and advantages of the invention will be apparent from the following detailed description which illustrates, by way of example, features of the invention.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a dye" includes reference to one or more of such materials.

"Image permanence" refers to characteristics of an ink-jet printed image that relate to the ability of the image to last over a period of time. Characteristics of image permanence include image fade resistance, water fastness, humid fastness, light fastness, smudge resistance, air pollution induced fading resistance, scratch and rub resistance, etc.

"Media substrate" or "substrate" includes any substrate that can be coated for use in the ink-jet printing arts including papers, overhead projector plastics, coated papers, fabric, art papers, e.g., water color paper, and the like.

"Aluminum chloride hydrate," "ACH," "polyaluminum chloride," "PAC," "polyaluminum hydroxychloride," or the like, refers to a class of soluble aluminum products in which aluminum chloride has been partly reacted with base. The relative amount of OH compared to the amount of Al can determine the basicity of a particular product. The chemistry of ACH is often expressed in the form $Al_n(OH)_mCl_{(3n-m)}$, wherein n can be from 1 to 50, and m can be from 1 to 150. Basicity can be defined by the term m/(3n) in that equation. ACH can be prepared by reacting hydrated alumina $Al(OH)_3$ with hydrochloric acid (HCl). The exact composition depends upon the amount of hydrochloric acid used and the reaction conditions. Typically, the reaction can be carried out to give a product with a basicity of 40% to 60%, which can be defined as (%)=n/6×100. ACH can be supplied as a solution, but can also be supplied as a solid.

There are other ways of referring to ACH, which are known in the art. Typically, ACH comprises many different molecular sizes and configurations in a single mixture. An exemplary stable ionic species in ACH can have the formula $[Al_{12}(OH)_{24}AlO_4(H_2O)_{12}]^{7+}$. Other examples include $[Al_6(OH)_{15}]^{3+}$, $[Al_8(OH)_{20}]^{4+}$, $[Al_{13}(OH)_{34}]^{5+}$, $[Al_{21}(OH)_{60}]^{3+}$, etc. Other common names used to describe ACH or components that can be present in an ACH composition include Aluminum chloride hydroxide (8Cl); A 296; ACH 325; ACH 331; ACH 7-321; Aloxicoll; Aloxicoll LR; Aluminium hydroxychloride; Aluminol ACH; Aluminum chlorhydrate; Aluminum chlorhydroxide; Aluminum chloride hydroxide oxide, basic; Aluminum chloride oxide; Aluminum chlorohydrate; Aluminum chlorohydrol; Aluminum chlorohydroxide; Aluminum hydroxide chloride; Aluminum hydroxychloride; Aluminum oxychloride; Aquarhone; Aquarhone 18; Astringen; Astringen 10; Banoltan White; Basic aluminum chloride; Basic aluminum chloride, hydrate; Berukotan AC-P; Cartafix LA; Cawood 5025; Chlorhydrol; Chlorhydrol Micro-Dry; Chlorhydrol Micro-Dry SUF; E 200; E 200 (coagulant); Ekoflock 90; Ekoflock 91; GenPac 4370; Gilufloc 83; Hessidrex WT; HPB 5025; Hydral; Hydrofugal; Hyper Ion 1026; Hyperdrol; Kempac 10; Kempac 20; Kemwater PAX 14; Locron; Locron P; Locron S; Nalco 8676; OCAL; Oulupac 180; PAC; PAC (salt); PAC 100W; PAC 250A; PAC 250AD; PAC 300M; PAC 70; Paho 2S; PALC; PAX; PAX 11S; PAX 16; PAX 18; PAX 19; PAX 60p; PAX-XL 1; PAX-XL 19; PAX-XL 60S; PAX-XL 61S; PAX-XL 69; PAX-XL 9; Phacsize; Phosphonorm; (14) Poly (aluminum hydroxy)chloride; Polyaluminum chloride; Prodefloc AC 190; Prodefloc AL; Prodefloc SAB 18; Prodefloc SAB 18/5; Prodefloc SAB 19; Purachem WT; Reach 101; Reach 301; Reach 501; Sulzfloc JG; Sulzfloc JG 15; Sulzfloc JG 19; Sulzfloc JG 30; TAI-PAC; Taipac; Takibine; Takibine 3000; Tanwhite; TR 50; TR 50 (inorganic compound); UPAX 20; Vikram PAC-AC 100S; WAC; WAC 2; Westchlor 200; Wickenol 303; Wickenol CPS 325 Aluminum chlorohydrate $Al_2ClH_5O_5$ or $Al_2(OH)_5Cl2H_2O$ or $[Al(OH)_2Cl]_x$ or $Al_6(OH)_{15}Cl_3$; $Al_2(OH)_5Cl]_x$ Aluminum chlorohydroxide; Aluminum hydroxychloride; Aluminum chloride, basic; Aluminum chloride hydroxide; $[Al_2(OH)_nCl_{6-n}]_m$; $[Al(OH)_3]_nAlCl_3$; or $Al_n(OH)_mCl_{(3n-m)}$ (where generally, 0<m<3n); for example. In one embodiment, preferred compositions include aluminum chlorides and aluminum nitrates of the formula $Al(OH)_2X$ to $Al_3(OH)_8X$, where X is Cl or $NO_3$. In another embodiment, preferred compositions can be prepared by contacting silica particles with an aluminum chlorohydrate $Al_2(OH)_5Cl$ or $Al_2(OH)Cl_5.nH_2O$. It is believed that contacting a silica particle with an aluminum compound as described above causes the aluminum compound to become associated with or bind to the surface of the silica particles. This can be either by covalent association or through an electrostatic interaction to form a cationic charged silica, which can be measured by a Zeta potential instrument.

"Trivalent or tetravalent metal oxide" or "multivalent metal oxide" refers to compositions that can be used in conjunction with, or instead of, ACH to reverse the charge of a silica surface from negative (−) to positive (+). Specifically, the negative charge on silica can be reversed by adsorbing an excess of positively charged polyvalent metal oxide on the surface. Coatings included oxides of trivalent and tetravalent metals such as aluminum, chromium, gallium, titanium, and zirconium. For example, acidified silica can be mixed with a basic metal salt (such as $Al_2O_3$) to substantially cover the surface of silica particulates. By surface activation using such a multivalent metal oxide, the silica can carry a positive charge instead of negative charge at below a pH of 7.

"Porous media coating" typically includes inorganic particulates, such as silica particulates, bound together by a polymeric binder. Optionally, a mordant and/or other additives can also be present. The composition can be used as a coating for various media substrates, and can be applied by any of a number of methods known in the art. In accordance with the present invention, the inorganic particulates are reagent-modified and surface-activated.

"Active ligand" or "active moiety" includes any active portion of an organosilane reagent that provides a function at or near the surface of inorganic particles present in a porous media coating composition that is not inherent to an unmodified inorganic porous particulate. For example, an active ligand can be used to reduce the need for binder in a porous media coating composition, or can be configured to interact with a dye or other ink jet ink component, thereby improving permanence. For example, an amine can be present on an organosilane reagent to attract an anionic dye of an ink-jet ink.

"Organosilane reagent" or "reagent" includes compositions that comprise a desired moiety, such as an active ligand (or portion of the reagent that provides desired modified properties to an inorganic particulate surface of the porous media coating), which is covalently attached to a silane grouping. The organosilane reagent can become covalently attached or otherwise attracted to the surface of silica particulates. Examples of moieties that can provide a desirable function include anionic dye anchoring groups (such as amines, quaternary ammonium salts, etc.), ultraviolet absorbers, metal chelators, hindered amine light stabilizers, reducing agents, hydrophobic groups, ionic groups, buffering groups, or functionalities for subsequent reactions. The active moiety portion of the organosilane reagent can be directly attached to the silane grouping, or can be appropriately spaced from the silane grouping, such as by from 1 to 10 carbon atoms or other known spacer groupings. The silane grouping of the organosilane reagent can be attached to inorganic particulates of the porous media coating composition through hydroxyl groups, halo groups, or alkoxy groups present on the reagent. Alternatively, in some instances, the organosilane reagent can be merely attracted to the surface of the inorganic particulates.

The term "lower" when referring to organic compounds or groups (when not otherwise specified) can contain from 1 to 8 carbons. For example, lower alkoxy can include methoxy, ethoxy, propoxy, butoxy, etc. Additionally, lower alkyl can include methyl, ethyl, propyl, isopropyl, butyl, t-butyl, hexyl, etc.

"Surface-activated" refers to the surface of silica after being treated with an inorganic surface activating agent, such as aluminum chloride hydrate and/or a multivalent metal oxide, in a sufficient amount to modify the net charge of the surface from negative (−) to positive (+). This is not to say that all negatively charged moieties are converted to positive, but that the net charge of the entire surface is generally positive.

"Reagent-modified" refers to silica modified by an organosilane reagent. Typically, the reagent can include an active ligand or moiety in addition to the silane coupling group. It is not required that the organosilane reagent be covalently attached to the surface of the silica, though such attachment with respect to at least some of the reagent is believed to occur.

"Treated silica" refers to silica particulates that are both surface-activated with an inorganic surface modifying agent, as well as reagent-modified with an organosilane reagent.

The term "about" when referring to a numerical value or range is intended to encompass the values resulting from experimental error that can occur when taking measurements.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In accordance with the present invention, a method of treating silica in an aqueous environment can comprise steps of dispersing silica particulates in an aqueous environment to form an aqueous dispersion; reversing the net charge of a surface of the silica particulates from negative to positive using a surface activating agent, thereby forming surface-activated silica particulates dispersed in the water; and contacting the surface-activated silica particulates with organosilane reagents to form reagent-modified and surface-activated silica particulates.

Alternatively, a method of preparing an ink-jet media sheet can comprise the steps of preparing a porous coating composition including reagent-modified and surface-activated silica particulates and an organic binder, and coating the porous coating composition on a media substrate. The reagent-modified and surface-activated silica particulates can be prepared in accordance with the method of treating silica described above.

With either method, the preparation of the reagent-modified and surface-activated silica particulates can be by a similar method. For example, in one embodiment, the aqueous dispersion described above can include the surface activating agent prior to the dispersing step, and the reversing step can occur as the silica particulates are dispersed in the aqueous dispersion portion-wise. In another embodiment, the surface activating agent can be added to the aqueous dispersion after the silica particulates. In yet another embodiment, the dispersing step and the reversing step occur as both the silica particulates and the surface activating agent are added to the aqueous environment simultaneously. The reagent can then be added to the silica after the reversing step, in one embodiment.

There are several advantages of the present invention. One of which is related to the ability to provide an active ligand or moiety as part of a porous media coating wherein the active moiety is at or near the surface of the inorganic particulates of a porous media coating. In addition, a silica surface with a net positive charge can be prepared to attract anionic components of an ink-jet ink. Thus, for example, a positive charge provided by an inorganic activating agent can attract an anionic dye to the silica surface, thereby reducing dye migration, bleed, and other issues often associated with dye-based ink-jet ink printing. Additionally, because the active moiety of an organosilane reagent is also used, and is also at or near the surface of the particulates of the porous media coating composition, a smaller amount of active ligand can be used to provide a desired result.

Other advantages include results achieved due to the presence of both an organic and inorganic surface modifier. For example, organosilane reagent treated silica often provides poor coalescence, but can show air fade resistance gain. Conversely, silica treated with an inorganic surface activating agent, such as aluminum chloride hydrate and/or a multivalent metal oxide, provides good coalescence performance, but poorer air fade resistance. By incorporating both an organosilane reagent and an inorganic activating agent at or near the surface of silica, a balance between the good air fade resistance and good coalescence can be achieved. Additionally, by providing a system that uses water as the preparative solvent, steps related to removing organic solvent prior to media substrate coating can be eliminated.

The aqueous dispersion can include from 10 wt % to 40 wt % silica particulates with respect to the amount of water in the aqueous environment. As silica particulates tend to agglomerate or form aggregates in water, a high shear mixer, such as Ross mixer or rotor/stater mixer can be used to disperse the silica particulates to an average size from about 20 nm to about 500 nm. In one embodiment, the silica can be sheared to form silica particulates or aggregates of an average size from about 50 nm to 300 nm.

With specific reference to the surface activating agent, in one embodiment, the surface activating agent can be aluminum chloride hydrate. In another embodiment, the surface activating agent can be a trivalent or tetravalent metal oxide, with metals such as aluminum, chromium, gallium, titanium, and zirconium. If, for example, aluminum chloride hydrate is used, it can be present in the aqueous dispersion at from 2 wt % to 20 wt % compared to the silica content, and in a more detailed embodiment, the aluminum chloride hydrate can be present at from 5 wt % to 10 wt %. Without being bound by any particular theory, it is believed that the aluminum of the aluminum chloride hydrate associates with an oxygen at the surface of the silica particulates. For example, silica ($SiO_2$) typically includes Si—OH groups at the surface of the individual particulates, which can act as a weak acid, liberating hydrogen and becoming ionized at a pH above about 2. As the pH is raised, the surface of the silica becomes more negative. The addition of aluminum chloride hydrate to silica causes the surface of the silica to become more positive. If enough aluminum chloride hydrate is added, then the net charge of the silica particulates becomes generally positive, which can be beneficial in the ink-jet arts when printing with anionic dye-containing ink-jet inks. It is believed that the aluminum of the aluminum chloride hydrate can interact with the ionized —Si—O⁻ group at the surface of the silica, thus, converting some moieties at the surface to a more positive state. As stated, 2 wt % to 20 wt %, compared to the silica content, is enough to achieve a desired degree of positive charge at the silica surface. Thus, in this state, the silica is said to be "surface-activated."

As the addition of aluminum chloride hydrate, trivalent metal oxide, and/or tetravalent metal oxide provides an inorganic means of adding positive surface charge to silica, a more organic grouping can also be added to provide increased positive charge, or provide another active ligand functionality. Specifically, organosilane reagents can be added to the surface-activated silica to add additional positively charged moieties to the surface, or to provide another desired function at or near the surface, e.g., ultraviolet absorber, chelating agent, hindered amine light stabilizer, reducing agent, hydrophobic group, ionic group, buffering group, or functionality for a subsequent reaction. As these reagents are primarily organic, they can provide different properties with respect to ink jet ink receiving properties. For example, using a combination of aluminum chloride hydrate and an organosilane reagent can result in improved water fastness, improved humid fastness, improved color gamut, and reduced cracking.

In one embodiment, the organosilane reagents can be amine-containing silanes. In a more detailed embodiment, the amine-containing silanes can include quaternary ammonium salts. Examples of amine-containing silanes include 3-aminopropyltrimethoxysilane, N-(2-aminoethyl-3-aminopropyltrimethoxysilane, 3-(triethoxysilylpropyl)-diethylenetriamine, poly(ethyleneimine)trimethoxysilane, aminoethylaminopropyl trimethoxysilane, aminoethylaminoethylaminopropyl trimethoxysilane, and the quaternary ammonium salts of the amine coupling agents mentioned above. An example of a quaternary ammonium salt organosilane reagent includes trimethoxysilylpropyl-N,N,N-trimethylammonium chloride.

Alternatively, other organosilane coupling agents can be useful for the modification of a silica surface, including bis(2-hydroethyl)-3-aminopropyltriethoxysilane, 3-mercaptopropyltrimethoxysilane, 3-glycidoxypropyltrimethoxysilane, bis(triethoxysilylpropyl)disulfide, 3-aminopropyltriethoxysilane, 3-aminopropylsilsesquioxane, bis-(trimethoxysilylpropyl)amine, N-phenyl-3-aminopropyltrimethoxysilane, N-aminoethyl-3-aminopropylmethyldimethoxysilane, 3-ureidopropyltrimethoxysilane, 3-methacryloxypropyltrimethoxysilane, N-(trimethyloxysilylpropyl)isothiouronium chloride, N-(triethoxysilpropyl)-O-polyethylene oxide, 3-(triethoxylsilyl)propylsuccinic anhydride, 3-(2-imidazolin-1-yl) propyltriethoxysilane, and reagents sold under the trade name SILQUEST (OSI Products), SiventoSilane (Degussa), Dynasylan, and/or Cab-O-SiL M-5 (Cabot Corp.).

Other organosilane reagents can also be used that provide a benefit to a printing system, such as reagents that include an active ligand or moiety. Examples of such active ligands or moieties include those that act as an ultraviolet absorber, chelating agent, hindered amine light stabilizer, reducing agent, hydrophobic group, ionic group, buffering group, or functionality for a subsequent reaction. To illustrate this, Formula 1 provides examples of organosilane reagents that can accordingly be used:

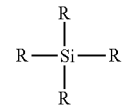

Formula 1

In Formula 1 above, from 0 to 2 of the R groups can be H, —$CH_3$, —$CH_2CH_3$, or —$CH_2CH_2CH_3$; from 1 to 3 of the R groups can be halo or alkoxy; and from 1 to 3 of the R groups can be an active ligand or moiety, such as one described previously. If halo is present, then Formula 1 can be said to be an organohalosilane reagent. If alkoxy is present, then Formula 1 can be said to be an organoalkoxysilane reagent.

The active ligand or moiety can be any composition that can be part of the organosilane reagent of Formula 1, provided it is compatible with water when integrated as part of the reagent. An inclusive list of active moieties in addition to that described previously can include straight or branched alkyl having from 1 to 22 carbon atoms, cyano, amino, halogen substituted amino, carboxy, halogen substituted carboxy, sulfonate, halogen substituted sulfonate, halogen, epoxy, furfuryl, mercapto, hydroxyl, pyridyl, imidazoline derivative-substituted lower alkyl, lower cycloalkyl, lower alkyl derivatives of cycloalkyl, lower cycloalkenyl, lower alkyl derivatives of cycloalkenyl, lower epoxycycloalkyl, lower alkyl derivatives of epoxycycloalkyl, phenyl, alkyl derivatized phenyl, phenoxy, poly(ethylene oxides), poly (propylene oxide), copolymer of polyethyleneoxide and poly(propyleneoxide), vinyl, benzylic halogen, alkyl derivatized phenoxy, quaternary amine, monoethyleneimine, or polyethyleneimine.

There are many alternative methods of treating silica particulates with an inorganic surface activating agent and an organosilane reagent. Aluminum chloride hydrate will be described for exemplary purposes, though other surface activating agents could likewise be used. Specifically, an inorganic surface activating agent can be added to water prior to silica, and then the silica can be added portion-wise over a period of time. Alternatively, the silica can be dispersed in water first, and then the inorganic surface activating agent can be added to the silica dispersion. In this embodiment, the ACH can be added all at once, or portion-wise, depending on the desired result. In another embodiment, both the silica and the inorganic surface activating agent can be added to water simultaneously. In each of these embodiments, the net surface charge of the silica can be converted from negative (−) to positive (+). This does not mean that every negatively charged moiety is necessarily converted from negative to positive, but that the surface charge as a whole becomes more positive than negative. Typically, after combining the inorganic surface activating agent and the silica, the organosilane reagent can then be added, though this order of addition is not required. For example, in one embodiment, after forming the silica/inorganic surface activating agent composition as described above, an organosilane reagent can be added to an inorganic surface activating agent treated silica portion-wise. Such an addition scheme can prevent flocculation of the silica. In this embodiment, the pH can be controlled to maintain the colloidal stability of the silica dispersion. Alternatively, the ACH and the organosilane reagent can be added simultaneously to a silica dispersion. In each of these reaction schemes, little or no organic solvent needs to be used. For example, the aqueous environment can include a predominant amount of water, and can optionally include small amounts of organic solvent, surfactant, crosslinking agent such as boric acid, etc. Further, in some embodiments, it may be desirable to include mordants and/or other additives in the coating composition.

As mentioned, treated silica particulates for use in ink jet media coatings can comprise silica particulates being surface-activated by a member selected from the group consisting of an aluminum chloride hydrate, a trivalent metal oxide, a tetravalent metal oxide, and combinations thereof. The silica particulates can also be reagent-modified by an organosilane reagent. The treated silica particulates can be prepared in accordance with the preparative methods described previously. Additionally, a media sheet having a treated silica particulate-containing coating can comprise a porous coating composition, including treated silica particulates being surface-treated, such as in an aqueous environment, with organosilane reagents and surface activating agent. The treated silica particulates can be admixed with a binder to form a porous coating composition, and a media substrate can have the porous coating composition coated thereon. The media substrate can be of any substrate known in the art, and can include papers, overhead projector plastics, coated papers, fabric, art papers, e.g., water color paper, photobase, or the like. The application of the porous coating composition to a media substrate can be by any method known in the art, such as air knife coating, blade coating, gate roll coating, doctor blade coating, Meyer rod coating, roller coating, reverse roller coating, gravure coating, brush coating, or sprayer coating.

As the treated silica typically has a net positive charge due to the presence of an inorganic surface activating agent, as well as an organosilane reagent that can optionally be positively charged, ink-jet inks that include anionic components can be prepared that work well with these media coatings. Specifically, if anionic dyes are present in an ink-jet ink, then the dye can be subject to dye mobilization on a treated silica media coating, thereby providing good image permanence with little dye migration.

This being stated, a system for printing ink-jet images with minimal dye mobility can comprise a media sheet and an ink-jet ink. The media sheet can have a porous coating composition coated thereon that includes treated silica particulates being reagent-modified and surface-activated in an aqueous environment, wherein the treated silica particulates have a net positive charge. A binder can be admixed with the treated silica particulates to form the porous coating composition, and a media substrate can have the porous coating composition coated thereon. Further, the ink-jet ink can have an anionic dye colorant configured for being printed on the media sheet.

Though any effective amount of dye can be used in this system, the ink-jet ink can include from 0.1 wt % to 10 wt % of the dye. Examples of suitable anionic dyes include a large number of water-soluble acid and direct dyes. Specific examples of anionic dyes include the Pro-Jet series of dyes available from Avecia Ltd., including Pro-Jet Yellow I (Direct Yellow 86), Pro-Jet Magenta I (Acid Red 249), Pro-Jet Cyan I (Direct Blue 199), Pro-Jet Black I (Direct Black 168), and Pro-Jet Yellow 1-G (Direct Yellow 132); Aminyl Brilliant Red F-B (Sumitomo Chemical Co.); the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), and Duasyn Acid Blue AE-SF VP344 (Acid Blue 9); mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Catodirect Yellow RL (Direct Yellow 86, Carolina Color and Chemical), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485 (a copper phthalocyanine); Magenta 377; mixtures thereof; and the like. This list is intended to be merely exemplary, and should not be considered limiting.

As mentioned, the ink-jet ink compositions of the present invention are typically prepared in an aqueous formulation or liquid vehicle which can include water, cosolvents, surfactants, buffering agents, biocides, sequestering agents, viscosity modifiers, humectants, binders, and/or other known additives. Typically, the ink-jet ink compositions of the present invention have a viscosity of between about 0.8 to about 8 cps. In one aspect of the present invention, the liquid vehicle can comprise from about 70 wt % to about 99.9 wt % of the ink jet ink composition. In another aspect, other than the colorant, liquid vehicle can also carry polymeric binders, latex particulates, and/or other solids.

As described, cosolvents can be included in the ink-jet compositions of the present invention. Suitable cosolvents for use in the present invention include water soluble organic cosolvents, but are not limited to, aliphatic alcohols, aromatic alcohols, dials, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-dials of 30 carbons or less, 1,3-dials of 30 carbons or less, 1,5-dials of 30 carbons or less, ethylene glycol alkyl ethers, propylene glycol alkyl ethers, poly (ethylene glycol) alkyl ethers, higher homologs of poly (ethylene glycol) alkyl ethers, polypropylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the ink-jet to minimize clogging or other properties of the ink such as viscosity, pH, surface tension, optical density, and print quality. The cosolvent concentration can range from about 1 wt % to about 40 wt %, and in one embodiment is from about 2 wt % to about 30 wt %. Multiple cosolvents can also be used, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.1 wt % to about 0.25 wt %.

In an additional aspect of the present invention, binders can be included in the liquid vehicle of the ink-jet ink which act to secure the colorants on the substrate. Binders suitable for use in the present invention typically have a molecular weight of from about 1000 Mw to about 3,000,000 Mw. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

If surfactants are present, then typical water-soluble surfactants such as TRITONS™ (including ethoxylated octyiphenols), IGEPALS™ (including alkyl phenoxypoly (ethleneoxy) ethanols), SILWETS™ (including silicone glycol copolymers including polyalkylene oxide-modified polydimethylsiloxanes, SURFYNOLS™ (including ethoxlyated tetramethyl decyndiols), TERGITOLS™ (including ethoxylated trimethylnonanols), BRIJS™ (including polyoxyethylene ethers), PLURONICS™ (including ethylene oxide/ propylene oxide copolymers), FLUORADS™ and ZONYLS™ (including fluorosurfactants), and NEODOLS™ (including nonionic ethoxylated surfactants). Other surfactants or wetting agents that can be used include Wetting Olin 10G, alkyl polyethylene oxides, alkyl phenyl polyethylene oxides, polyethylene oxide (PEO) block copolymers, acetylenic PEO, PEO esters, PEO amines, PEO amides, and dimethicone copolyols. Any of these surfactants, or combination of these surfactants or other surfactants, can be present at from 0.01 wt % to about 10 wt % of the ink-jet ink composition.

EXAMPLES

The following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what are presently deemed to be the most practical and preferred embodiments of the invention.

Example 1

Dispersion of Fumed Silica in Water without ACH Treatment (Silica 1, 0% ACH, 0% Silane)

About 1.25 g of $Li_2CO_3$ and 400 g of deionized water were charged in a 1 L stainless beaker. A high shear and high torque air mixer was used for ingredient mixing and ingredient addition. About 100 g of Cab-O-Sil M-5 (fumed silica from Cabot Corp. having a surface area of 200 $m^2/g$) was added portion-wise, and 4M HCl was added concurrently to keep pH below 4.0. The viscosity of the dispersion increased rapidly with the addition of silica, but reduced dramatically with the adjustment of pH. After the addition of the fumed silica, the dispersion was further sheared with a rotor/stator (Silverson L4RT-W) at 7000 RPM for 30 minutes. The Brookfield viscosity was about 114 cps, and the solids content was 20 wt %.

Example 2

Dispersion of Fumed Silica in Water with ACH Treatment (Silica 2, 10% ACH, 0% Silane)

About 1.25 g of $Li_2CO_3$, 27.4 g of Locron (50% of aluminumchlorohydrol in water from Clariant Chemical Co.), and 346.4 g of deionized water were mixed and stirred with a high torque air mixer until all of the components were dissolved. Next, about 125 g of Cabo-O-Sil M-5 (fumed silica from Cabot Corp. having a surface area of 200 $m^2/g$) were added to the mixture portion wise to prevent the silica from undesirably solidifying. The total addition time was about 40 minutes. About 125 ml of deionized water was then added and the dispersion was further sheared with a rotor/stator (Silverson L4RT-W) at 7000 RPM for 30 minutes. The Brookfield viscosity was about 146 cps, the pH was 3.84, and the solids content was about 20 wt %.

Example 3

Aminosilane Reagent Modification of Silica without pH Monitoring (Silica 3, 0% ACH, 5% Silane)

About 30 g of the silica dispersion prepared in accordance with Example 1 was reacted with 1.5 g of aminosilane reagent (20 wt % Silquest A-1120; aminoethylaminopropyl trimethoxysilane in ethanol) in a magnetic stirrer. The initial pH of the silica dispersion was about 3.0, and the aminosilane reagent was added in five equal portions to the silica dispersion. The dispersion solidified undesirably almost immediately with the addition of aminosilane reagent.

Example 4

Aminosilane Reagent Modification of ACH Surface Activated Silica without pH Monitoring (Silica 4, 10% ACH, 5% Silane)

About 30 g of the surface activated silica dispersion prepared in accordance with Example 2 was reacted with 1.5 g of aminosilane reagent (20 wt % Silquest A-1120; aminoethylaminopropyl trimethoxysilane in ethanol) in a magnetic stirrer. The initial pH of the silica dispersion was about 3.0, and the aminosilane reagent was added in five equal portions to the silica dispersion. The dispersion solidified undesirably upon addition of the third portion of the aminosilane reagent.

Example 5

Aminosilane Reagent Modification of Silica (without ACH) with pH Monitoring (Silica 5, 0% ACH, 5% Silane)

About 30 g of the silica dispersion prepared in accordance with Example 1 was reacted with 1.5 g of aminosilane reagent (20 wt % Silquest A-1120; aminoethylaminopropyl trimethoxysilane in ethanol) in a magnetic stirrer by adding the aminosilane reagent dropwise. The pH was continuously monitored and adjusted with 1M HCl to maintain the pH at from about 3 to 3.5. After about a quarter of the aminosilane reagent was added, the pH of the dispersion increased very rapidly and the silica dispersion solidified.

Example 6

Aminosilane Reagent Modification of ACH Surface Activated Silica with pH Monitoring (Silica 6, 10% ACH, 5% Silane)

About 30 g of the surface activated silica dispersion prepared in accordance with Example 2 was reacted with 1.5 g of aminosilane reagent (20 wt % Silquest A-1120; aminoethylaminopropyl trimethoxysilane in ethanol) in a magnetic stirrer by adding the aminosilane reagent dropwise. The pH was continuously monitored and adjusted with 1M HCl to maintain the pH at from about 3 to 3.5. After all of the aminosilane reagent was added, a stable, low viscosity treated silica dispersion was obtained.

Example 7

Aminosilane Reagent Modification of ACH Surface Activated Silica with pH Monitoring (Silica 7, 10% ACH, 3% Silane)

About 30 g of the surface activated silica dispersion prepared in accordance with Example 2 was reacted with 0.9 g of aminosilane reagent (20 wt % Silquest A-1120; aminoethylaminopropyl trimethoxysilane in ethanol) in a magnetic stirrer by adding the aminosilane reagent dropwise. The pH was continuously monitored and adjusted with 1M HCl to maintain the pH at from about 3 to 3.5. After all of the aminosilane reagent was added, a stable low viscosity treated silica dispersion was obtained.

Example 8

Dispersion of Fumed Silica in Water with ACH Treatment (Silica 8, 5% ACH, 0% Silane)

About 0.625 g of $Li_2CO_3$, 13.7 g of Locron (50% of aluminumchlorohydrol in water from Clariant Chemical Co.), and 360.1 g of deionized water were mixed and stirred with a high torque air mixer until all of the components were dissolved. Next, about 125 g of Cabo-O-Sil M-5 (fumed silica from Cabot Corp. having a surface area of 200 $m^2/g$) were added to the mixture portion-wise to prevent the silica from undesirably solidifying. The total addition time was about 40 minutes. About 125 ml of deionized water was then added and the dispersion was further sheared with a rotor/stator (Silverson L4RT-W) at 7000 RPM for 30 minutes. The Brookfield viscosity was about 40 cps, the pH was 3.5, and the solids content was about 20 wt %.

Example 9

Aminosilane Reagent Modification of ACH Surface Activated Silica with pH Monitoring (Silica 9, 5% ACH, 5% Silane)

About 30 g of the surface activated silica dispersion prepared in accordance with Example 8 was reacted with 1.5 g of aminosilane reagent (20 wt % Silquest A-1120; aminoethylaminopropyl trimethoxysilane in ethanol) in a magnetic stirrer by adding the aminosilane reagent dropwise. The pH was continuously monitored and adjusted with 1M HCl to maintain the pH at from about 3 to 3.5. After all of the aminosilane reagent was added, a stable low viscosity treated silica dispersion was obtained.

Examples 1 to 9 demonstrate typical methods of dispersing fumed silica with and without the presence of ACH, and treating the silica dispersion with various levels of aminosilanes. ACH can also be added to the silica dispersion after the dispersion is finished. In general, the mixture can be aged at elevated temperature for a certain time until the conductivity of the dispersion is reduced to a minimum. This same principle can be used for the dispersion and treatment of different types of fumed silica (surface area, aggregate size, etc.) and different silane coupling agents.

Example 10

Viscosity Stability Study

Four fumed silica coating compositions prepared above were used as ink-jet coating recording materials. The formulations, based on dry parts by weight, are shown in Table 1 below, as follows:

TABLE 1

| Ingredient | Coating 1 | Coating 2 | Coating 3 | Coating 4 |
| --- | --- | --- | --- | --- |
| Cab-O-Sil M-5 (control) | 100 parts | | | |
| Silica 2 | | 100 parts | | |
| Silica 7 | | | 100 parts | |
| Silica 9 | | | | 100 parts |
| Mowiol 2688(PVA) | 25 parts | 25 parts | 25 parts | 25 parts |
| [1]Dye stabilizer | 2.08 parts | 2.08 parts | 2.08 parts | 2.08 parts |
| Boric acid | 3.57 parts | 3.57 parts | 3.57 parts | 3.57 parts |
| Wetting agent | 0.248 parts | 0.248 parts | 0.248 parts | 0.248 parts |
| Glycerol | 1.42 parts | 1.42 parts | 1.42 parts | 1.42 parts |
| [2]% Solid | 18 | 18 | 18 | 18 |

[1]Optional ingredient to interact with dye upon printing to improve print quality
[2]Water was added in an amount to provide the percentage of solids indicated.

Example 11

Viscosities of Coating Compositions

The viscosities of the coatings prepared in accordance with Example 10 were tested, as shown in Table 2 below:

TABLE 2

| | 0 minutes | 60 minutes | 120 minutes | 180 minutes |
| --- | --- | --- | --- | --- |
| Coating 1 (M-5 control) | >10,000 cps | — | — | — |
| Coating 2 (Silica 2) | 1240 cps | 2640 cps | 3010 cps | 3492 cps |
| Coating 3 (Silica 7) | 1120 cps | 1236 cps | 1452 cps | 1788 cps |
| Coating 4 (Silica 9) | 430 cps | 360 cps | 486 cps | 500 cps |

The viscosity of Coatings 1 to 4 was measured by Brookfield Viscometer (Model VR-7714) at 40° C. Based on the viscosity measurements, the fumed silica dual treated with ACH and aminosilane reagent not only reduced fluid viscosity, but also greatly improved the long term stability of the coating fluid. Table 2 depicts the relative stability of Coatings 3 and 4. Though still an improvement over untreated silica, Coating 2 became generally more viscous over time, i.e. more solidified or gelled over time. Coating 1 (unmodified Cab-O-Sil M-5) had extremely high viscosity and could not be stirred.

Example 12

Image Quality and Humid Fastness of Ink-Jet Recording Materials Including ACH-Modified and/or Aminosilane-Modified Silica Cab-O-Sil LM-130 from Cabot Chemicals was treated with different combinations of ACH and aminoalkylsilsesquioxane oligomer (tradename WSA-9911 by Gelest Inc.). The detailed formulations are shown in Table 3 below. These modified silica compositions were used to prepare porous ink-jet recording coatings based on the formulation described in Table 4.

TABLE 3

| | Silica 10 | Silica 11 | Silica 12 | Silica 13 | Silica 14 |
| --- | --- | --- | --- | --- | --- |
| [3]LM-130 | LM-130* | LM-130 | LM-130 | LM-130 | LM-130 |
| ACH | 0 wt % | 1.5 wt % | 3.5 wt % | 5.25 wt % | 7.0 wt % |
| [4]Aminosilane | 4 wt % | 3 wt % | 2 wt % | 1 wt % | 0 wt % |

[3]Cab-O-Sil LM-130 (Cabot Corp.).
[4]22-25% solid aminoalkylsilsesquioxane oligomer in water (Gelest Inc.)

TABLE 4

| Ingredient | Amount (dry) |
| --- | --- |
| Silica 10, 11, 12, 13, or 14 | 73.84 wt % |
| Mowiol (PVA) | 18.48 wt % |
| Dye stabilizer | 3.02 wt % |
| Boric acid | 3.10 wt % |
| Nonionic surfactant | 0.91 wt % |
| Glycerol | 0.65 wt % |

The aminosilane reagent treated silica (Silica 10), provided poor coalescence, but showed some air fade resistance gain. Aluminum chloride hydrate (ACH) treated silica (Silica 14), provided good coalescence performance, but exhibited poor air fade resistance. By incorporating both ACH and the aminosilane reagent (Silicas 11-13), a balance between the good air fade resistance and good coalescence was achieved.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. Treated silica particulates for use in ink-jet media coatings, comprising silica particulates being surface-activated by a surface activating agent to form surface-activated silica particulates, the surface activating agent including an aluminum chloride hydrate, wherein the surface-activated silica particulates are reagent-modified by an organosilane reagent after combining the surface activating agent and the silica particulates, the organosilane reagent including N-(2-aminoethyl-3-aminopropyltrimethoxysilane, 3-(triethoxysilylpropyl)-diethylenetriamine, poly(ethyleneimine) trimethoxysilane, aminoethylaminopropyl trimethoxysilane, aminoethylaminoethylaminopropyl trimethoxysilane, N-aminoethyl-3-aminopropylmethyldimethoxysilane, or a quaternary ammonium salt thereof, and wherein the aluminum chloride hydrate is present in an amount of 2 wt % to 20 wt % compared to the silica particulates content.

2. Treated silica particulates as in claim 1, wherein the silica particulates are from 10 nm to 500 nm in size.

3. Treated silica particulates as in claim 1, wherein the organosilane reagent includes a quaternary ammonium salt of N-(2-aminoethyl-3-aminopropyltrimethoxysilane, a quaternary ammonium salt of 3-(triethoxysilylpropyl)-diethylenetriamine, a quaternary ammonium salt of poly(ethyleneimine)trimethoxysilane, a quaternary ammonium salt of aminoethylaminopropyl trimethoxysilane, a quaternary ammonium salt of aminoethylaminoethylaminopropyl trimethoxysilane, or a quaternary ammonium salt of N-aminoethyl-3-aminopropylmethyldimethoxysilane.

4. Treated silica particulates as in claim 1, wherein the silica particulates are surface-activated and reagent-modified in an aqueous environment.

5. Treated silica particulates as in claim 1, wherein the surface activating agent is aluminum chloride hydrate.

6. Treated silica particulates as in claim 1, wherein the aluminum chloride hydrate is present in an amount of 5 wt % to 10 wt % compared to the silica content.

7. The silica particulates of claim 1, wherein the organosilane reagent is aminoethylaminopropyl trimethoxysilane.

8. The silica particulates of claim 4, wherein the aqueous environment has a pH from 3 to 3.5.

* * * * *

UNITED STATES PATENT AND TRADEMARK OFFICE
CERTIFICATE OF CORRECTION

PATENT NO. : 9,938,418 B2
APPLICATION NO. : 13/113841
DATED : April 10, 2018
INVENTOR(S) : Tienteh Chen et al.

It is certified that error appears in the above-identified patent and that said Letters Patent is hereby corrected as shown below:

On the Title Page

Item (56), under US Patent Documents, in Column 2, Line 28, delete "Frederiksson et al." and insert -- Fredriksson et al. --, therefor.

Signed and Sealed this
Twenty-eighth Day of August, 2018

Andrei Iancu
*Director of the United States Patent and Trademark Office*